Sept. 8, 1964 M. R. HOLMBERG 3,147,606
SADDLE STAND
Filed Dec. 18, 1961 2 Sheets-Sheet 1
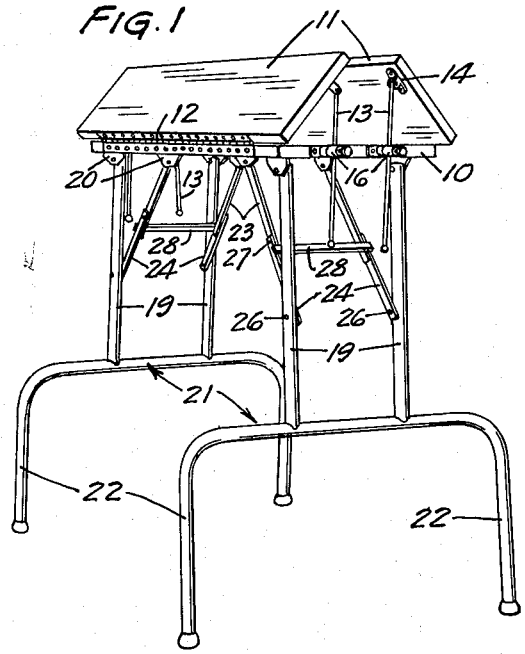
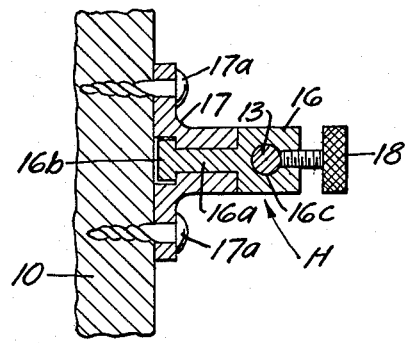
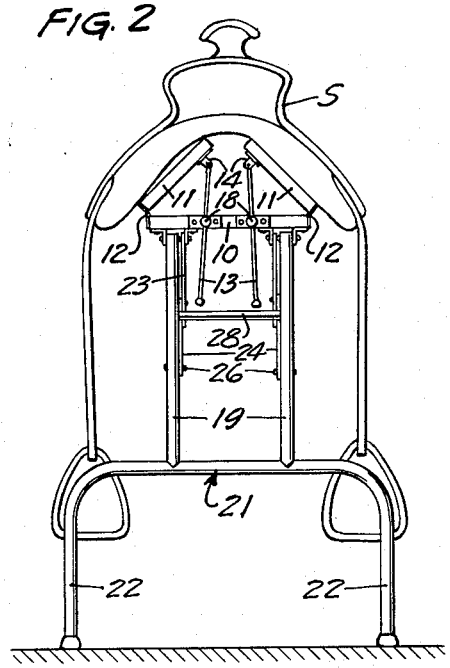
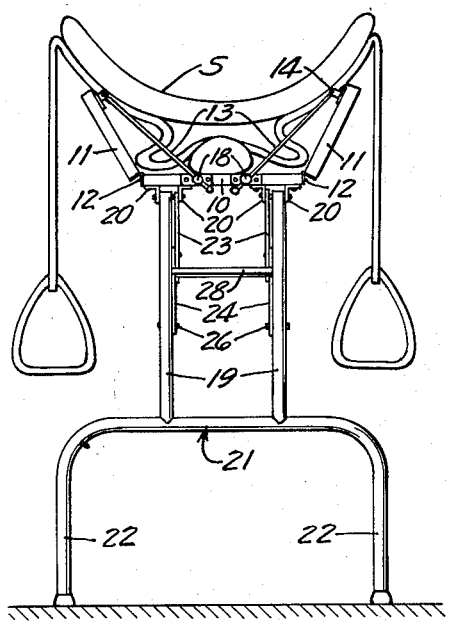
INVENTOR
MELVIN R. HOLMBERG
BY Williamson & Palmatier
ATTORNEYS Sept. 8, 1964  M. R. HOLMBERG  3,147,606
SADDLE STAND
Filed Dec. 18, 1961  2 Sheets-Sheet 2
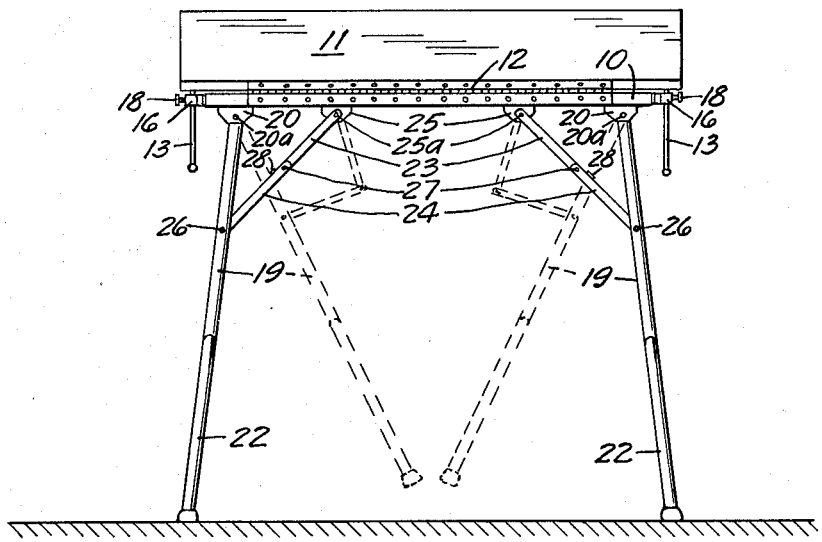
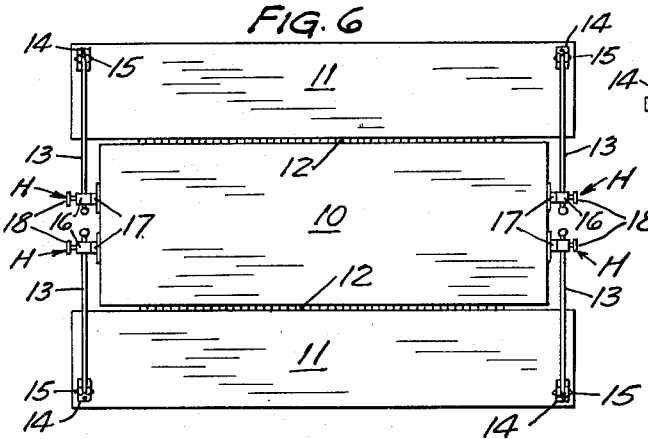
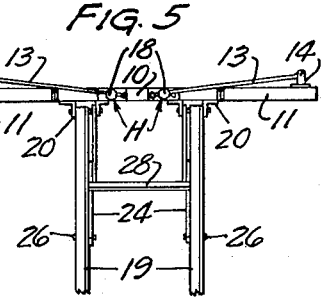
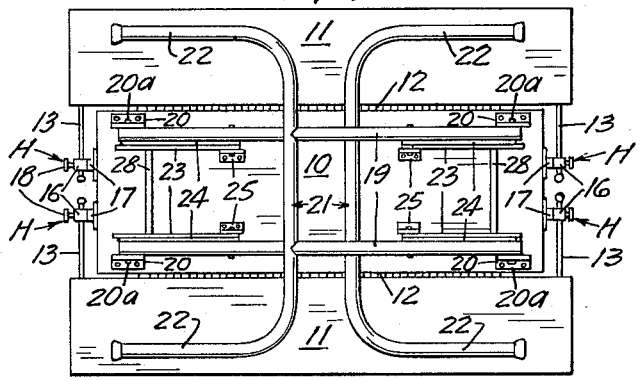
INVENTOR
MELVIN R. HOLMBERG
BY Williamson & Palmatier
ATTORNEYS

United States Patent Office 3,147,606
Patented Sept. 8, 1964

3,147,606
SADDLE STAND
Melvin R. Holmberg, 5441 Woodlawn Blvd.,
Minneapolis, Minn.
Filed Dec. 18, 1961, Ser. No. 159,832
15 Claims. (Cl. 69—19)

This invention relates to a novel stand for supporting riding saddles and the like.

An object of this invention is to provide a novel stand which is capable of supporting a saddle in normal upright astride position and in upside down position as desired to facilitate the storage, servicing and repairing of the saddle.

Another object is to provide a stand of the type described which can be collapsed and folded into a relatively small flat compact package for convenience in storage and transport thereof.

Still another object is to provide a saddle stand which can be adjusted to support the saddle in astride or upside down position which can also be adjusted to function and have utility as a table.

A more specific object is to provide a stand having adjustable side leaves which can be placed in closed converging relationship to each other to support a saddle thereon in upright astride position, and which can be placed in partially open non-converging or diverging relationship to each other to form a trough for receiving and supporting a saddle in reversed upside down position.

These and other objects and advantages of my invention are more fully understood from the following description made in connection with the accompanying drawings, wherein like reference characters refer to the same or similar parts throughout the several views, and in which:

FIG. 1 is a perspective view of a saddle stand of this invention with the leaves in closed position for mounting the saddle in normal upright astride position;

FIG. 2 is an end elevational view of the stand of FIG. 1 with a saddle mounted thereon in astride position;

FIG. 3 is an end elevational view of the stand with the leaves in partially open position with a saddle mounted thereon in upside down position;

FIG. 4 is a side elevational view of the stand as shown in FIG. 1;

FIG. 5 is a partial and elevational view showing the stand in completely opened position;

FIG. 6 is a top plan view of the stand when open;

FIG. 7 is a bottom view of the open stand with the legs in collapsed folded condition; and FIG. 8 is an enlarged detail view of section of one of the hinge assemblies for mounting the leaf holding rods.

Reference is now made to the accompanying drawings for a more detailed description and better understanding of this invention.

The saddle stand shown in the accompanying drawings has saddle supporting top structure which includes an elongated center panel 10 which also constitutes the top portion of the base, and a pair of side panels or leaves 11, the sides of which are hingedly mounted to the sides of the center panel 10 by means of the hinge members 12 whereby, in the form shown, the side leaves can assume any position between horizontal and upwardly inwardly inclined position overlying the center panel. This hinged construction and arrangement enables the side leaves 11 to be moved relative to the center panel 10 to form thereof with a variety of different shapes depending upon the purpose and use intended.

To maintain the side leaves 11 in any position desired, elongate longitudinally adjustable bracing rods 13 are provided at each end of the side leaves whereby each end of each leaf is suitably braced. Each of these rods has one end thereof hingedly or pivotally connected to its respective leaf by means of a mounting bracket 14 which is secured to the leaves and to which the rods 13 are hingedly connected by means of the hinge pins 15.

The rods 13 are pivotally and adjustably connected to the ends of the center panel 10 by means of hinge assemblies H best seen in FIG. 8. These assemblies include swivel members 16 having shanks 16a which are rotatably journalled in the base mounting member 17 and retained thereon by means of the flared end portions 16b whereby the swivel members 16 are free to rotate about their shank axis, the base members 17 being secured to the ends of the center panel 10 by suitable screw fasteners 17a.

The swivel members have openings 16c extending therethrough which slidably receive the rods 13. Threaded set screws 18 are provided which threadedly engage the swivel members 16 whereby they can be tightened so as to bear against the rods 13 to hold them against longitudinal movement relative to the swivel members, and enable the rods to hold and brace their respective leaves. Thus, the hinge assemblies H permit the rods to be longitudinally adjusted and to rotate relative to the center panel to assume any position or attitude necessary to brace the leaves in any position desired.

To move the side leaves 11 to any desired position, the set screws 18 are simply loosened so as to enable the rods 13 to slide relative to the swivel members 16, the members 16 turning in accordance with the movements of the rods 13 as they adjust themselves longitudinally and angularly to the position of the side leaves 11. When the side leaves are in the desired position, the set screws are tightened so as to re-engage the rods 13 and prevent movement thereof, the rods 13 thereby holding the leaves 11 in the position desired.

The stand also includes a pair of collapsible supporting leg units disposed at opposite ends thereof. Each of these leg units includes a pair of parallel laterally spaced apart members 19 which are hingedly connected at their upper ends to the center panel 10 by means of the mounting brackets 20 and hinge pins 20a. The members 19 are secured at their lower ends to a member 21 shaped in the form of an inverted U so as to provide a pair of supporting legs 22. Each of these leg units is provided with a pair of collapsible toggle type leg bracing units for holding the leg units in braced unfolded supporting position and which permit collapsing of the leg units to the folded position shown in FIG. 7 when desired. Each of these bracing units include a pair of link elements 23 and 24. The link elements 23 are hingedly connected at one end to the underside of the center panel 10 by means of the mounting brackets 25 and hinge pins 25a and the other links 24 are hingedly connected at one end thereof to the members 19 by means of the hinge pins 26. The links 23 and 24 are hingedly connected to each other by means of the hinge pins 27. A cross bar 28 extends between and interconnects the links 24 of each leg unit, which cross bar can be grasped to facilitate simultaneous operation and manipulation of each pair of interconnected bracing units of each leg unit. The links are locked in place when fully extended.

If the saddle S is to be mounted in normal upright astride position as in FIG. 2, the side leaves 11 are folded inwardly to a closed upwardly converging relationship such as shown in FIGS. 1 and 2 to cooperatively form an inverted V shaped saddle supporting frame whereby the leaves engage and support the underside of the saddle as shown. If the saddle is to be mounted upside down as in FIG. 3, the leaves 11 are swung outwardly to a partially extended upwardly and outwardly inclined diverging position such as shown in FIG. 3 to form with the center panel 10 a trough for receiving and supporting the upper side of the saddle, whereby the underside of the saddle is exposed for convenience in servicing or repairing thereof.

If desired, the top structure may be flattened out by substantially completely opening the leaves by swinging them downwardly to the substantially fully extended position as seen in FIG. 5. This enables the stand to be folded into a flat compact package, and further enables the stand to be used as a conventional table.

If the stand is to be stored or transported, the leg units may be collapsed and folded underneath the center panel 10 and leaves 11 by articulating the bracing units such as by pushing the cross bars 28 inwardly thereby causing the links to fold upon themselves and the leg units to fold up underneath the top structure in nested side-by-side relationship as seen in FIG. 7 to make a compact package which is convenient to carry, store or transport.

From the foregoing, the advantages of this invention are readily apparent. The stand of this invention can be easily converted into a plurality of different shapes depending upon the use to which it is to be put. Thus, it can be converted into an inverted V-shaped frame for supporting the saddle in astride position, it can be quickly converted into an open trough arrangement for mounting the saddle upside down, and it can be quickly converted into a substantially flat table structure. Furthermore, the leg structure can be conveniently collapsed and folded underneath the top structure to make a compact package which is easy to carry, transport and store.

Although the stand of this invention finds particular utility and usefulness as a saddle stand, it will be understood that the invention is not necessarily limited to such a use and application.

It will also of course be understood that various changes may be made in the form, details, arrangement and proportions of the various parts without departing from the scope of my invention.

What I claim is:

1. A stand comprising a base, a pair of leaves, means for selectively mounting said leaves on said base in opposed upwardly converging and non-converging relationship, and bracing means other than said leaves for selectively holding said leaves in said relationships.

2. A stand comprising a base, a pair of leaves hingedly mounted on said base in opposed relationship for swinging movement of each about a fixed axis between upwardly converging and non-converging relationship, and bracing means other than said leaves for holding said leaves in said converging and non-converging relationships.

3. A stand comprising a base, a pair of leaves hingedly mounted on said base in opposed relationship for movement between an upwardly converging position and substantially horizontal position, and means for selectively holding said leaves in any position between said converging and horizontal positions.

4. A stand comprising a base including a top portion and collapsible leg structure capable of being folded against said top portion, a pair of side leaves hingedly mounted on the top portion of said base on opposite sides thereof for movement between upwardly converging and non-converging relationship, and means for selectively holding said leaves in said relationships.

5. A stand comprising a base, a pair of leaves, means for mounting said leaves in opposed relationship on said base whereby said leaves may be selectively positioned in upwardly converging and upwardly diverging relationship, and bracing means other than said leaves for selectively holding said leaves in said relationships.

6. A stand comprising a base, a pair of leaves hingedly mounted on said base in opposed relationship thereon for movement between upwardly converging and non-converging relationship, and adjustable means for selectively holding said leaves in the position desired, said means comprising an elongate rod, first pivot means connecting said rod with a leaf and second pivot means connecting said rod with the base whereby said rod extends between a leaf and the base and is capable of pivotal movement relative to each of them, said rod being capable of longitudinal movement relative to one of said pivot means, and releasable retaining means for holding said rod against said longitudinal movement.

7. A stand comprising a base, a pair of leaves hingedly mounted on said base in opposed relationship thereon for movement between upwardly converging and non-converging relationship, and adjustable means for holding said leaves in the position desired, said means comprising an elongate rod, first pivot means connecting said rod with the base whereby said rod extends between a leaf and the base and is capable of pivotal movement relative to each of them, one of said pivot means including a freely rotatable member having an opening extending therethrough for slidably receiving said rods, and releasable retaining means for holding said rod against said longitudinal movement.

8. A stand comprising a base which includes a top portion and leg structure depending therefrom, a pair of leaves hingedly mounted on said top portion on opposite sides thereof for movement between upwardly converging and non-converging relationship whereby a saddle may be mounted astride said leaves when they are in converging relationship and may be mounted upside down therebetween when they are in non-converging relationship, and elongate bracing means adapted to extend between and interconnect said leaves and top portion and capable of longitudinal adjustment to hold said leaves in said converging and non-converging relationships.

9. The stand of claim 8, wherein said leg structure is hingedly mounted to said top portion and capable of being folded thereagainst.

10. The stand of claim 8, where said leaves are capable of being moved to supported substantially horizontal position.

11. A stand comprising top structure including a center portion and a pair of side portions hingedly mounted on opposite sides of said center portion for swinging movement of each about a fixed axis between upwardly converging and non-converging relationship whereby a saddle may be mounted astride said side portions when in converging relationship and may be mounted upside down therebetween when they are in non-converging relationship, and bracing means other than said side portions for selectively holding said side portions immovable in said converging and non-converging relationships.

12. The stand of claim 11, wherein said side portions are movable to a substantially horizontal position wherein they are in substantially co-planar relationship with said center portion.

13. A stand comprising top structure including a center portion and a pair of side portions hingedly mounted on opposite sides of said center portion for movement between upwardly converging and non-converging relationship, adjustable bracing means interconnecting said center portion and said side portions for holding said side portions in said converging and non-converging relationships, and leg structure connected to and depending from said center portion.

14. A stand comprising top structure including a center portion and a pair of side portions hingedly mounted on opposite sides of said center portion for swinging movement of each about a fixed axis between upwardly converging, upwardly diverging, and substantially horizontal co-planar positions, and means other than said side portions for selectively holding said side portions in any of said positions.

15. A stand comprising a base, a pair of leaves, and means for selectively mounting said leaves on said base in opposed upwardly converging and upwardly diverging relationships and in horizontal co-planar relationship with each other, and means other than said leaves for selectively holding said leaves in said relationships.

References Cited in the file of this patent

UNITED STATES PATENTS

| | | |
|---|---|---|
| 292,657 | Kirkpatrick | Jan. 29, 1884 |
| 320,903 | Hogeland | Nov. 10, 1885 |
| 1,166,700 | McDaniel | Jan. 4, 1916 |
| 1,265,848 | Wheeler | May 14, 1918 |
| 1,543,372 | Didricksen | June 23, 1925 |
| 2,335,692 | Murray | Nov. 30, 1943 |
| 2,403,324 | Anderson | July 2, 1946 |
| 2,416,410 | Shampaine | Feb. 25, 1947 |
| 2,520,389 | Ferris | Aug. 29, 1950 |
| 2,596,986 | Curtis | May 20, 1952 |

FOREIGN PATENTS

| | | |
|---|---|---|
| 432,131 | France | Nov. 29, 1911 |